US012474180B2

(12) United States Patent
Hossain et al.

(10) Patent No.: US 12,474,180 B2
(45) Date of Patent: *Nov. 18, 2025

(54) METHOD AND DEVICE FOR CORRECTING ERRORS IN MAP DATA

(71) Applicant: GRABTAXI HOLDINGS PTE. LTD., Singapore (SG)

(72) Inventors: Evan Hossain, Singapore (SG); Hao Wu, Singapore (SG); Xiaocheng Huang, Singapore (SG); Padarn George Wilson, Singapore (SG); Guanfeng Wang, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,069

(22) Filed: Oct. 10, 2023

(65) Prior Publication Data

US 2024/0035844 A1     Feb. 1, 2024

Related U.S. Application Data

(63) Continuation of application No. 17/636,854, filed as application No. PCT/SG2020/050348 on Jun. 22, 2020, now Pat. No. 11,808,602.

(51) Int. Cl.
*G01C 21/00*     (2006.01)
*G06F 16/215*     (2019.01)
(Continued)

(52) U.S. Cl.
CPC ..... *G01C 21/3815* (2020.08); *G01C 21/3859* (2020.08); *G01C 21/3867* (2020.08);
(Continued)

(58) Field of Classification Search
CPC ............ G01C 21/3815; G01C 21/3859; G01C 21/3867; G01C 21/3804; G06F 16/215;
(Continued)

(56) References Cited

U.S. PATENT DOCUMENTS 8,005,612 B2    8/2011   Asahara et al.
8,145,588 B2    3/2012   Becker
(Continued)

FOREIGN PATENT DOCUMENTS

CN     101750089 A     6/2010
CN     102567429 A     7/2012
(Continued)

OTHER PUBLICATIONS

Skiena S.S., Graph Traversal, The Algorithm Design Manual, 2nd ed., DOI: 10.1007/978-1-84800-070-4_5; 2008, pp. 145-190, Springer-Verlag London Limited.
(Continued)

*Primary Examiner* — Nga X Nguyen
(74) *Attorney, Agent, or Firm* — Maschoff Brennan

(57) ABSTRACT

Aspects concern a method for correcting errors in map data comprising obtaining map data specifying travel possibilities between locations, generating a routing graph from the map data by assigning a vertex to each location and an edge from one vertex to another vertex if the map data specifies that it is possible to travel from the location to which the first vertex is assigned to the location to which the second vertex is assigned, identifying the largest strongly connected component of the routing graph, identifying one or more further strongly connected components of the routing graph, detecting errors in the map data by identifying travel possibilities that are not in the map data which lead to missing connections between the one or more further strongly connected components of the routing graph and the largest strongly
(Continued)

connected component of the routing graph and amending the map data by the identified travel possibilities.

14 Claims, 9 Drawing Sheets

(51) Int. Cl.
  *G06F 16/29* (2019.01)
  *G08G 1/00* (2006.01)
  *G08G 1/0968* (2006.01)
(52) U.S. Cl.
  CPC ............ *G06F 16/215* (2019.01); *G06F 16/29* (2019.01); *G08G 1/096827* (2013.01); *G08G 1/09685* (2013.01); *G08G 1/202* (2013.01)
(58) Field of Classification Search
  CPC .............. G06F 16/29; G08G 1/096827; G08G 1/09685; G08G 1/202; G06Q 10/02; G06Q 50/40
  See application file for complete search history.

(56) References Cited

U.S. PATENT DOCUMENTS

| | | | |
|---|---|---|---|
| 8,326,531 B2 | 12/2012 | Sawai et al. | |
| 8,928,698 B2 | 1/2015 | Pirwani et al. | |
| 8,990,017 B2 | 3/2015 | Schilling et al. | |
| 9,816,823 B2 | 11/2017 | Wang et al. | |
| 9,841,289 B2 | 12/2017 | Schilling et al. | |
| 11,808,602 B2 * | 11/2023 | Hossain | G06F 16/29 |
| 2008/0249705 A1 * | 10/2008 | Matsuda | G01C 21/3889 |
| | | | 701/532 |
| 2008/0300778 A1 | 12/2008 | Kuznetsov | |
| 2011/0015860 A1 * | 1/2011 | Nesbitt | G01C 21/30 |
| | | | 701/533 |
| 2012/0158301 A1 | 6/2012 | Schilling et al. | |
| 2015/0153183 A1 * | 6/2015 | Kadous | G01C 21/3815 |
| | | | 701/532 |
| 2016/0063032 A1 | 3/2016 | Kishore | |
| 2017/0261328 A1 | 9/2017 | Tuukkanen | |
| 2019/0137289 A1 | 5/2019 | Annamalai et al. | |
| 2020/0166361 A1 | 5/2020 | Voznesensky et al. | |

FOREIGN PATENT DOCUMENTS

| | | |
|---|---|---|
| CN | 102947676 A | 2/2013 |
| CN | 108108854 A | 6/2018 |

OTHER PUBLICATIONS

Connected Components, Nov. 15, 2015; Retrieved on Jun. 4, 2021 from https://web.archive.org/web/20151115014952/https://www.sci.unich.it/ francesc/teaching/network/components.html; 10 pp. (access Feb. 18, 2022).

PCT International Search Report Application No. PCT/SG2020/050348, dated Sep. 9, 2020; 3 pp.

Mattus G., et al., DeepRoadMapper: Extracting Road Topology from Aerial Images, 2017, 9 pp., Uber Advanced Technologies Group; University of Toronto.

PCT International Preliminary Report on Patentability in Application No. PCT/SG2020/050283, dated Sep. 13, 2021; 4 pp.

Zinoune C., et al., Detection of Missing Roundabouts in Maps for Driving Assistance Systems, Jun. 2012, 6 pp., Heudiasyc UMR CNRS 7253, Universite de Technologie de Compiegne, Frane. Renault S.A.S, France.

Chinese Office Action and Search Report in patent application No. 202080052677.3, dated Jul. 11, 2022, (12 pp.).

PCT International Written Opinion in Application No. PCT/SG2020/050348, dated Sep. 9, 2020; 4 pp.

IDS filed in connection with U.S. Appl. No. 17/636,854 dated Feb. 18, 2022.

IDS filed in connection with U.S. Appl. No. 17/636,854 dated Apr. 26, 2022.

IDS filed in connection with U.S. Appl. No. 17/636,854 dated Aug. 11, 2022.

* cited by examiner

METHOD AND DEVICE FOR CORRECTING ERRORS IN MAP DATA

The present invention is non-provisional continuation claiming priority to non-provisional application U.S. Ser. No. 17/636,854 which was filed on Feb. 18, 2022, and is entitled: "METHOD AND DEVICE FOR CORRECTING ERRORS IN MAP DATA" which is a 371 of International Application No. PCT/SG2020/050348, filed on Jun. 22, 2020, each of which is hereby incorporated by reference herein in their entirety.

TECHNICAL FIELD

Various aspects of this disclosure relate to methods and devices for correcting errors in map data.

BACKGROUND

The quality of an e-hailing server which enables customers to hail taxis using their smartphones largely depends on the underlying map data which is for example used for estimating the time when the driver will be there to pick up the user, a price of the ride and how long it will take to get to the destination. Accordingly, it is desirable to keep this map data up-to-date with the real world. However, updating of maps may require a high amount of resource in view of the high number of ever-changing maps. Moreover, manual updating of maps has the risk of introducing human errors. Accordingly, approaches for making updating and enhancing of map data more efficient and less error-prone are desirable.

SUMMARY

Various embodiments concern a method for correcting errors in map data including obtaining map data specifying travel possibilities between locations, generating a routing graph from the map data by assigning a vertex to each location and an edge from one vertex to another vertex if the map data specifies that it is possible to travel from the location to which the first vertex is assigned to the location to which the second vertex is assigned (e.g. if the map data specifies that it is possible to travel directly along a road segment from the location to which the first vertex is assigned to the location to which the second vertex is assigned), identifying the largest strongly connected component of the routing graph, identifying one or more further strongly connected components of the routing graph, detecting errors in the map data by identifying travel possibilities that are not in the map data which lead to missing connections between the one or more further strongly connected components of the routing graph and the largest strongly connected component of the routing graph and amending the map data by the identified travel possibilities.

According to one embodiment, the travel possibilities are directed travel possibilities and the routing graph is a directed routing graph.

According to one embodiment, the travel possibilities include roads associated with an allowed travel direction.

According to one embodiment, the method includes associating each further strongly connected component of the routing graph with a connectivity class of a plurality of connectivity classes, wherein the connectivity classes include one or more of a class of strongly connected components each being isolated from the largest strongly connected component and including multiple vertices, a class of strongly connected components each having a single vertex isolated from the other strongly connected components, a class of strongly connected components each having a single vertex which can only be reached from a vertex of one or more other strongly connected components, and a class of strongly connected components each having a single vertex which cannot be reached from any other strongly connected component but from which strongly connected component can be reached, wherein the method further includes detecting errors in the map data using the connectivity classes associated with the further strongly connected components of the routing graph.

According to one embodiment, the method includes associating groups of two or more strongly connected components of the routing graph with a connectivity relation of a plurality of connectivity relationships, wherein the connectivity relationships include one or more of a connectivity relationship indicating that there are edges between the strongly connected components of the group, a connectivity relationship indicating that the group of strongly connected components forms a maximum path of single vertices and a connectivity relationship indicating that historic driving data of a geographical region represented by the map data indicates that a driver has travelled between vertices of the strongly connected components which are not connected in the routing graph, wherein the method further includes detecting errors in the map data using the connectivity relationships associated with the groups of strongly connected components of the routing graph.

According to one embodiment, the method further includes acquiring historic driving data of a geographical region represented by the map data, determining whether there exists a pair of vertices including a first vertex and a second vertex in the routing graph wherein the map data does not specify a travel possibility form the first vertex to the second vertex but the historic driving data indicates that a driver has travelled from the location to which the first vertex is assigned to the location to which the second vertex is assigned and determining that the map data lacks a travel possibility from the location to which the first vertex is assigned to the location to which the second vertex is assigned if such a pair of vertices exists.

According to one embodiment, the method includes iteratively amending the map data by iteratively repeating the generating of a routing graph, identifying the largest strongly connected component of the routing graph, identifying one or more further strongly connected components of the routing graph, detecting errors and amending the map data, wherein the map data amended in a previous iteration is used as map data for a current iteration.

According to one embodiment, the method includes monitoring a quality of the map data by iteratively repeating the obtaining of map data, generating of a routing graph, identifying the largest strongly connected component of the routing graph and identifying one or more further strongly connected components of the routing graph and determining a quality indicator of the routing graph and tracking the quality indicator over time.

According to one embodiment, the method includes generating an alarm signal when the quality indicator falls below a predetermined threshold.

According to one embodiment, the method includes exporting a specification of the identified strongly connected components of the routing graph to a visualization tool.

According to one embodiment, the method further includes visualizing the identified strongly connected components of the routing graph.

According to one embodiment, the visualizing further includes visualizing connectivity classes of strongly connected components or connectivity relationships of groups of two or more strongly connected components or both.

According to one embodiment, the visualizing further includes overlaying the strongly connected components with a geographic map given by the map data.

According to one embodiment, the method further includes navigating one or more vehicles by the amended map data.

According to one embodiment, the method further includes transmitting the amended map data to a vehicle and controlling the vehicle using the amended map data.

According to various embodiments, a server computer including a communication interface, a memory and a processing unit configured to perform the method of any one of the above embodiments is provided.

According to one embodiment a computer program element is provided including program instructions, which, when executed by one or more processors, cause the one or more processors to perform the method of any one of the above embodiments.

According to one embodiment a computer-readable medium is provided including program instructions, which, when executed by one or more processors, cause the one or more processors to perform the method of any one of the above embodiments.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other devices or methods. Similarly, embodiments described in the context of a device are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

In the following, embodiments will be described in detail.

An e-hailing app, typically used on a smartphone, allows its user to hail a taxi (or also a private driver) through his or her smartphone for a trip.

Figure 1:
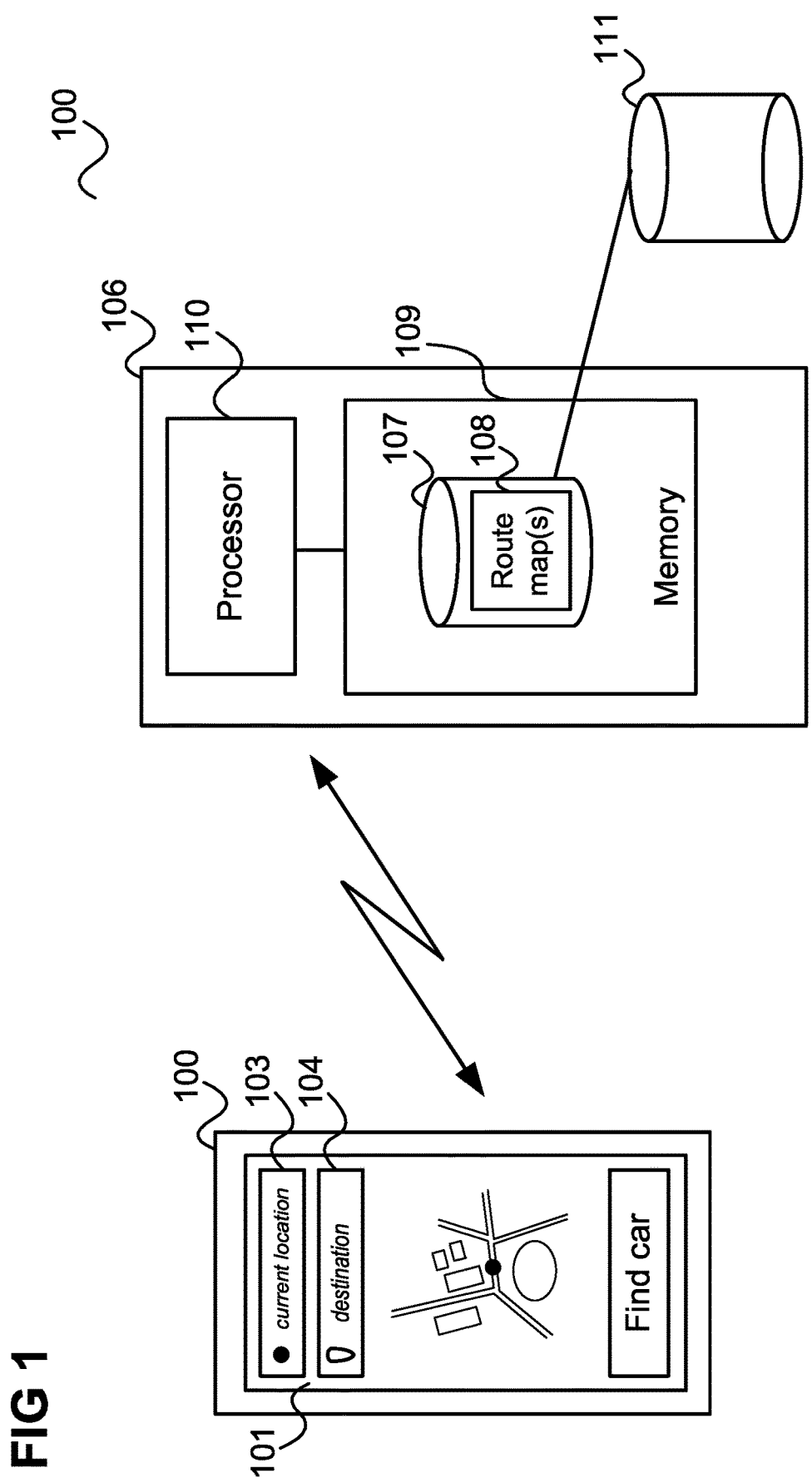
FIG. 1 shows a communication arrangement including a smartphone and a server.

FIG. 1 shows a communication arrangement including a smartphone 100 and a server (computer) 106.

The smartphone 100 has a screen showing the graphical user interface (GUI) of an e-hailing app that the smartphone's user has previously installed on his smartphone and has opened (i.e. started) to e-hail a ride (taxi or private driver).

The GUI 101 includes a map 102 of the user's vicinity (which the app may determine based on a location service, e.g. a GPS-based location service). Further, the GUI 101 includes a box for point of departure 103 (which may be set to the user's present location obtained from location service) and a box for destination 104 which the user may touch to enter a destination (e.g. opening a list of possible destinations). There may also be a menu (not shown) allowing the user to select various options, e.g. how to pay (cash, credit card, credit balance of the e-hailing service). When the user has selected a destination and made any necessary option selections, he or she may touch a "find car" button 105 to initiate searching of a suitable car.

For this, the e-hailing app communicates with the server 106 of the e-hailing service via a radio connection. The server 106 includes a database 107 knowing the current location of registered drivers, when they are expected to be free, has information about traffic jams etc. From this, a processor 110 of the server 106 determines the most suitable driver (if available) and provides an estimate of the time when the driver will be there to pick up the user, a price of the ride and how long it will take to get to the destination. The server communicates this back to the smartphone 100 and the smartphone 100 displays this information on the GUI 101. The user may then accept (i.e. book) by touching a corresponding button.

To determine all route-related information, like the most suitable driver and an estimate of the time when the driver will be there to pick up the user, a price of the ride and how long it will take to get to the destination, the processor 110 access a database 107 storing map data including for example one or more road maps indicating where roads are located, the allowed direction of travel, speed limits, etc.

The database 107 is in this example implemented by a local memory 109 of the server computer 106. However, it may also be implemented at least partially externally to the server computer 106, e.g. in a cloud, and it may be filled by access to an external database 111, e.g. an open route map information database such as OSM (Open Street Map).

For determination of information like described above the map data 108 should be up to date and free of errors, i.e. should not lack travel possibilities (e.g. roads or allowed directions of travel) that exist in reality (i.e. in the physical geographic area represented by the map data). However, errors are typically introduced, for example by human error or inaccurate measurements (e.g. inaccurate (e.g. outdated) satellite images, positioning inaccuracies when driving along a route etc.).

Figure 2:
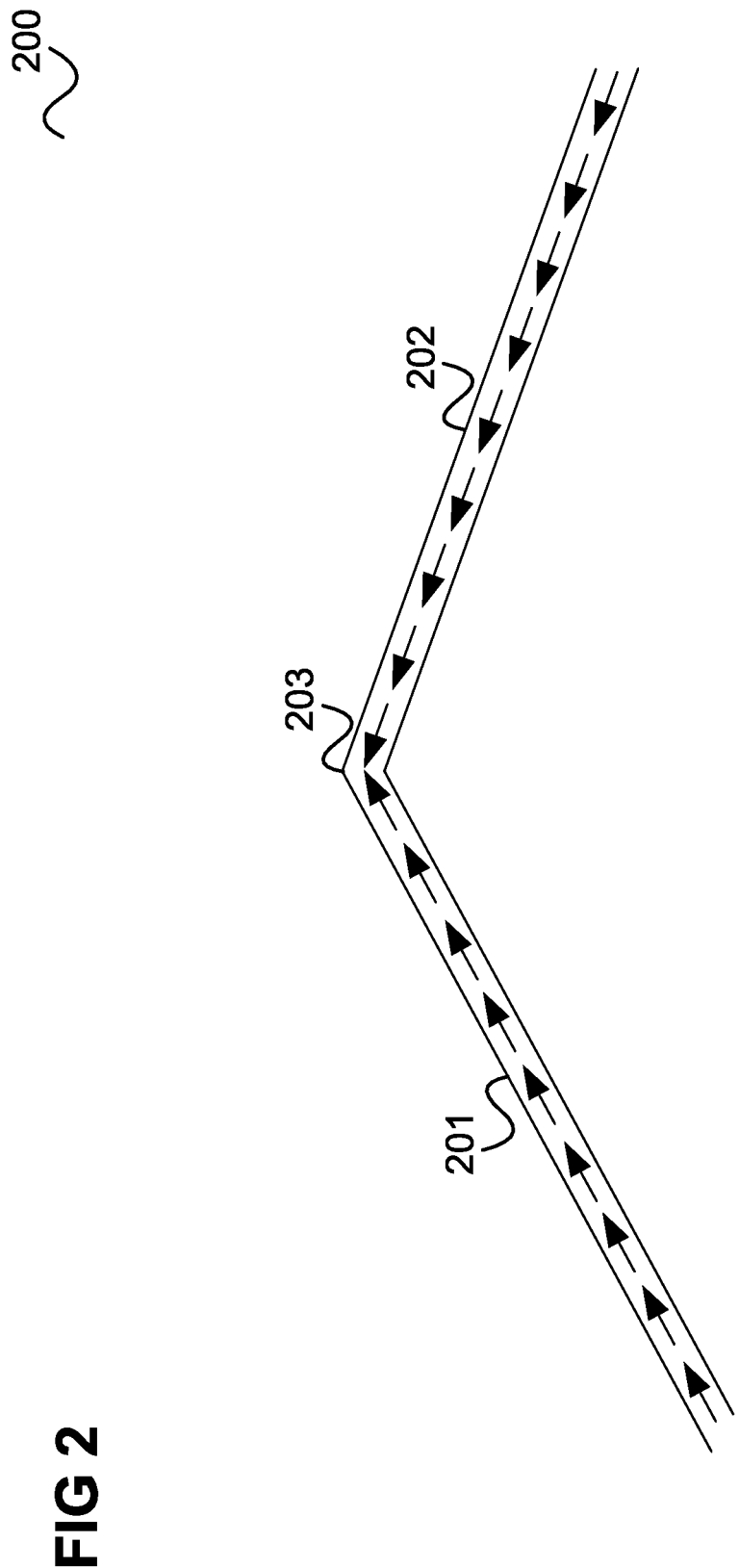
FIG. 2 illustrates an error of map data.

FIG. 2 illustrates an error of map data where the direction of (allowed) travel on a first part of a road 201 is different from a second part of the road 202 such that the direction of travel changes at a location 203. It is typically practically impossible to identify errors of this kind unless there is a complaint specifically regarding this case (e.g. by a driver expected to travel along the road 202 in the wrong direction).

Similar issues can occur due to wrong road restrictions and turn restrictions.

According to various embodiments, an approach which allows detecting problems in map data, e.g. of the kind as described above, is provided.

This approach makes, according to various embodiments, use of the fact that a routing graph should be strongly connected. This means that the graph which represents locations (represented by vertices of the graph) connected by roads (represented by roads of the graph) should ideally allow routing between any two points (vertices) in the graph. This may especially be an issue for map data of developing countries: in cities of such countries various map quality issues can cause this property not to hold. Various embodiments allow bringing these discrepancies to light.

Specifically, according to various embodiments, an approach is provided that (e.g. automatically) surfaces issues related to map connectivity and consists of a full end to end pipeline for continued improvement at low operational cost. It helps in finding, among other issues:

Missing roads
incorrect directions of travel
Incorrect road restrictions
Incorrect turn restrictions
Isolated or disconnected roads.

According to one embodiment, a routing graph (e.g. generated by the processor 110 from the map data 108) is decomposed into different elements which can be meaningfully classified and related to one another in terms of their connectivity. This classification system is integrated in a closed loop workflow that results in continued (iterative) improvements of the map data 108.

Thus, according to various embodiments, a closed loop is provided that utilizes both automation and manual operations work in a seamless way. This allows improving maps especially in regions with low quality and unplanned, quickly changing, road structure.

According to various embodiments, the processing of map data 108 includes connectivity classification and a pipeline that creates a feedback loop for map improvements.

Connectivity classification finds and classifies different parts of a routing graph generated from map data 108. This includes a classification of subgraphs of the routing graph based on their relationship with the full routing graph, and an algorithm for finding these classes in a scalable way.

Connectivity relationships are defined for groups (e.g. pairs) of different strongly connected components (SCC) of the whole routing graph. Connectivity classes are defined for individual SCCs. First the graph is broken down into its different SCCs and then each SCC is classified into one of multiple SCC classes based on its likely effect on the overall connectivity of the graph.

A strongly connected component is a subgraph of a graph in which there is a path between all pairs of vertices of the subgraph.

Figure 3:
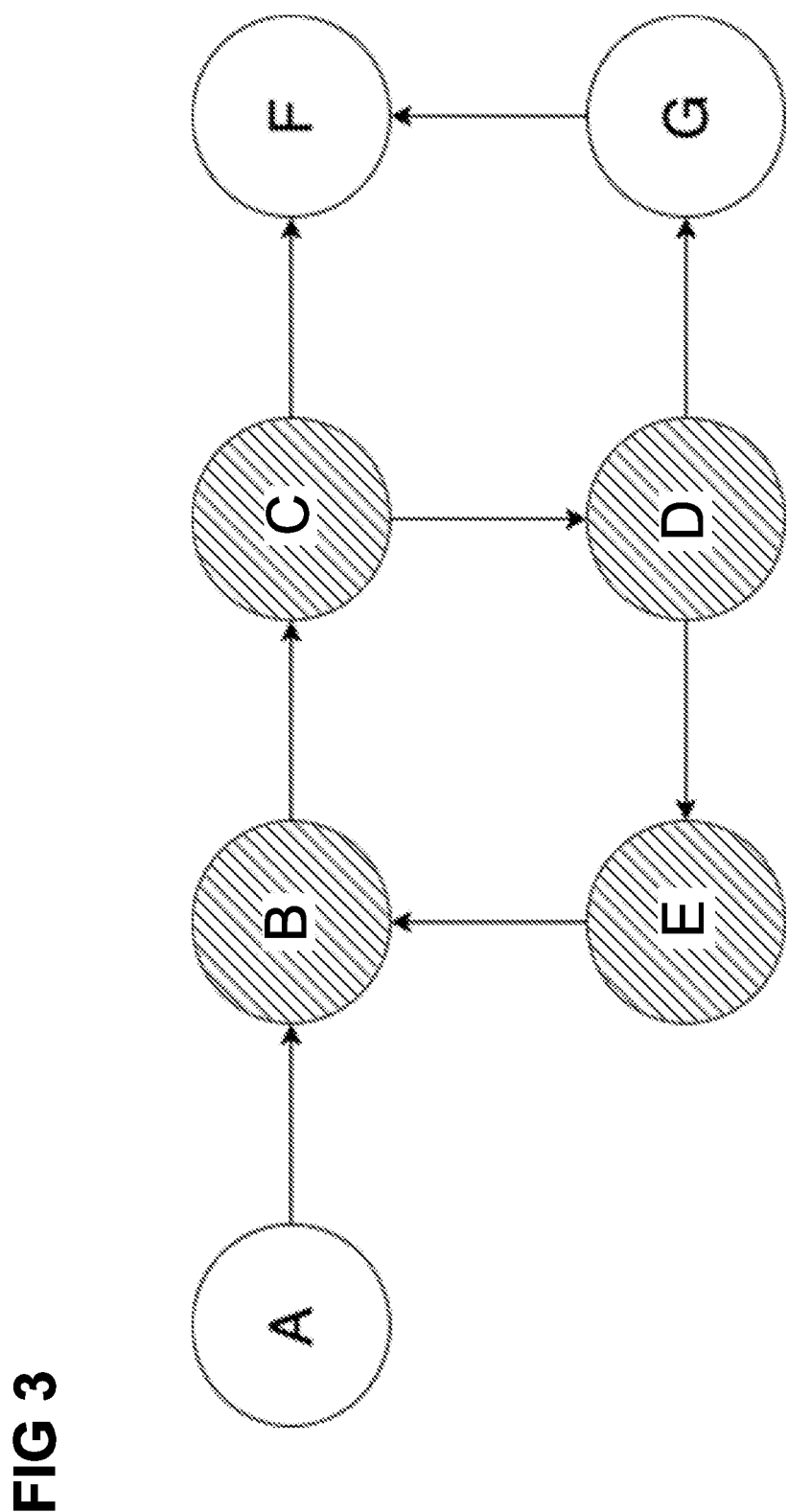
FIG. 3 shows an example of a routing graph and a strongly connected component (SCC) of the routing graph.

FIG. 3 shows an example of a graph having vertices A, B, C, D, E, F, G wherein the subgraph including vertices B, C, D, E forms a strongly connected component.

To determine the SCC class of an SCC and connectivity relationships between SCCs, the processor 110, for example, first identifies the SCC components of a routing graph (generated for the map data 108 to be analysed). This may for example be done by Kosaraju's algorithm or Tarjan's algorithm.

The SCC classes are designed to indicate what (if any) connectivity issues may be present with that SCC. In an ideal routing graph, there would only be one SCC. Therefore, the SCC classes are a hint towards what is preventing this from being true.

The SCC class of an SCC is for example determined by the size of the SCC and its connectivity to other SCCs of the routing graph. This breaks the SCC down into different classes (essentially a simple decision tree). An example for the SCC classes is as follows:

largest SCC: main graph
totally disconnected SCC: separate graphs (usually no routing problem but can be verified). Separate graphs may be caused for example by islands or private property.
single SCC: SCCs that are made of single nodes, often forming a line of SCC, can be further decomposed into start/end/isolated based on their in and out connections
other: unclassified, need more verification.

Other properties by be included in assigning the SCC class to an SCC.

An example of an algorithm in pseudo-code to classify SCCs into SCC classes is given as follows.

```
def n_i = number of nodes in the SCC
def o_i = number of out edges from SCC
def i_i = number of in edges from SCC
- if n_i = max_{ over graph } (n_i): largest
- else if n_i == 1:
    - if o_i > 0 and i_i == 0: single-start
    - else if o_i == 0 and i_i > 0: single-end
    - else: single-isolated
- else if o_i == 0 and i_i == 0: multi-isolated
- else: multi-other
```

In addition to the overall classifications of the routing graph's SCCs, connectivity relationships are determined. These relationships relate SCCs to other SCCs and provide a rating in a number of categories to indicate how likely these two SCCs have missing connectivity between them.

For calculating the connectivity relationships, the processor 110, for example, collects statistics on each individual SCC, and determines how these statistics relate to the wider routing graph and obtains driver travel history data. It may also use these statistics to build the connectivity classification for each SCC.

The connectivity relationships are computed between SCCs (wherein the connectivity between SCCs is weaker than strongly connected). For example, the connectivity of two or more SCCs is given a connectivity (or "secondary") relationship as follows connectivity relationship "connected": scc_i and scc_j are connected if there are any edges between them connectivity relationship "path": list of {sec_i} are a path if they are all single scc and scc_i is connected to scc_{i+1} for each scc in the path, and no other single scc can be added connectivity relationship "driver-connected-paths": two paths {scc_i} {scc_j} are driver-connected-paths if we have historic data of a driver travelling between nodes in the two paths, but they are otherwise disconnected.

This means that after determining the connectivity relationships between pairs or groups of SCCs, SCCs are related to one another by taking advantage of their proximity, shared relationships, graph cuts and historic data (e.g. from historic driver trajectories) to rate the probability of there being a missing connectivity between them. The trajectory data allows (in some cases) to identify suggested locations for the connectivity.

Figure 4:
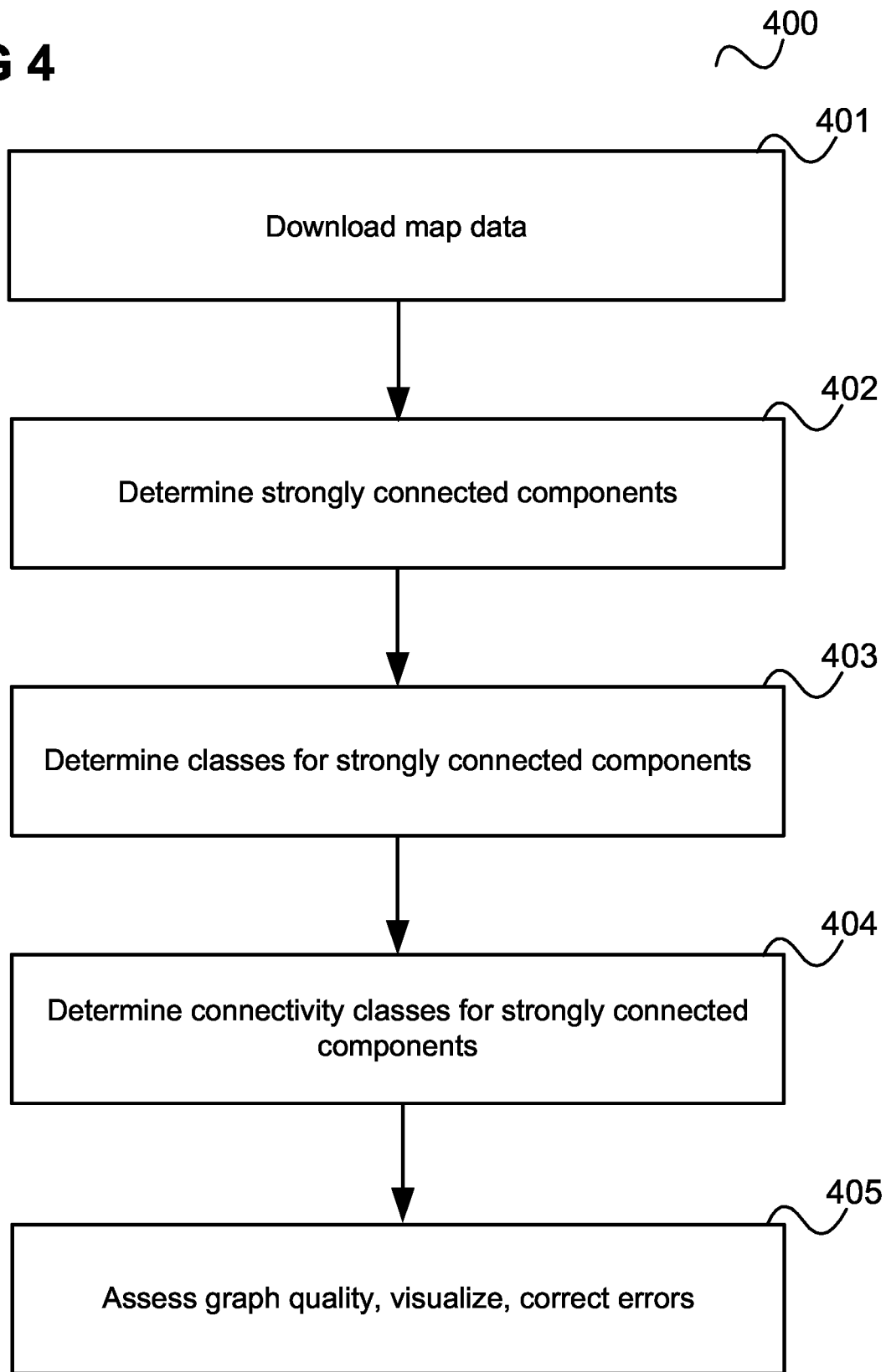
FIG. 4 shows a flow diagram according to an embodiment illustrating a processing of map data according to an embodiment.

According to various embodiments, the isolation categorization and detection is built into a pipeline of operations to process, classify, generate improvements as illustrated in FIG. 4. In the following, this is described as being performed by the server computer 106 of FIG. 1 but this is only an example and it may also be performed elsewhere, e.g. by another server computer (e.g. in a map data processing centre etc.) which provides the processed map data then to the server computer 106 for serving e-hailing requests.

FIG. 4 shows a flow diagram 400 according to an embodiment.

In 401, current map data is downloaded from a map repository, e.g. external database 111. This could either be a public or private repository, and both may be used. The processor 110 then generates a routing graph from the map data (e.g. for a certain geographic region) wherein it maps geographical locations to vertices and includes a directed edge into the routing graph form one vertex to another, if, according to the map data, there is a road from the vertex to the other vertex.

The processor 110 then processes the routing graph according to a classification process. This includes the determination of SCCs of the routing graph in 402, the determination of SCC classes for the determined SCCs in 403 and the determination of connectivity relationships for graphs in 404 as described above. This may in particular include, once all of the SCC components are found, collection of information about each SCC and its usage to categorize it into different types of potential map issues. The results of this may be collected and exported.

In 405, following the classification, the quality of the routing graph may be assessed based on the number of issues found and their severity. This may include determining a quality indicator, e.g. in the form of the value of a metric like scc_count/node_count i.e. the ratio of strongly connected components to the number of vertices (or nodes) in the routing graph. This example of a metric is simple but meaningful and gives a problem size estimate independent of map size—it should be a low number in the case of a high quality routing map.

The quality indicator may be exported (e.g. to an observation tool) and compiled into a time series. This allows map quality to be tracked over time, and gives an early warning for any map quality downgrades.

The output of the classification process can be exported, for example in form of one or more GPX (GPS Exchange Format) files. GPX is described by an XML schema and is designed as a common GPS (Global Positioning System) format for software applications. This can for example be fed into a visualization tool (e.g. OSM editor) for visualization (e.g. to be inspected by a user). With the aid of the connectivity classification, this allows (e.g. a user or an automatic analyzation tool) to identify many map errors caused by missing roads, wrong road and turn restrictions, and roads having incorrect direction of travel. Following the detection of an error, one or more changes to the map data may be submitted (e.g. by a user or automatically) and the process may again start with 401 with the changed map data. Each fix of the map data in this manner improves the classification of problems and thus forms a feedback improvement loop. This series of operations provides a closed loop system, resulting in iteratively improving maps.

The visualisation of the classification process results may include displaying the different classes and connectivity relationships by colour coding. For example, a user (e.g. of a map operations team of an e-hailing service) may overlay a visualization of the detections with the routing graph and satellite imagery. The above connectivity relationships can be tagged with suggested issues such as path: carpark, parking lot driver-connected-path: carpark, missing two-way street multi-isolated: missing bridge, incorrect travel direction These may be based on experience. An automated feedback into categories may also be provided.

Figure 5:
FIG. 5 shows an example visualization of the result of the processing of map data.

FIG. 5 shows an example visualization of the result of the processing of map data.

In this example, the roads belonging to largest SCC is shown with white filling and roads which are part of other SCCs are shown with black filling.

It should be noted that according to one embodiment map data is separated into multiple regional maps and a distributed system is implemented to handle the regional maps in parallel. As map data (e.g. city level maps) are added, jobs to run the processing on those graphs are may be added to a processing queue by a coordinator. Then, jobs are pulled from this queue and processed, e.g. as described with reference to FIG. 4.

Figure 6:
FIG. 6 shows an example where a poor or outdated satellite image leads to map data which gives rise to SCCs which are disconnected from the largest SCC in the routing graph.

FIG. 6 shows an example where a poor or outdated satellite image leads to map data which gives rise to SCCs which are disconnected from the largest SCC in the routing graph. It is possible to identify where the map data (supposedly) lacks roads (which are there in reality) resulting in the disconnected SCCs.

Figure 7:
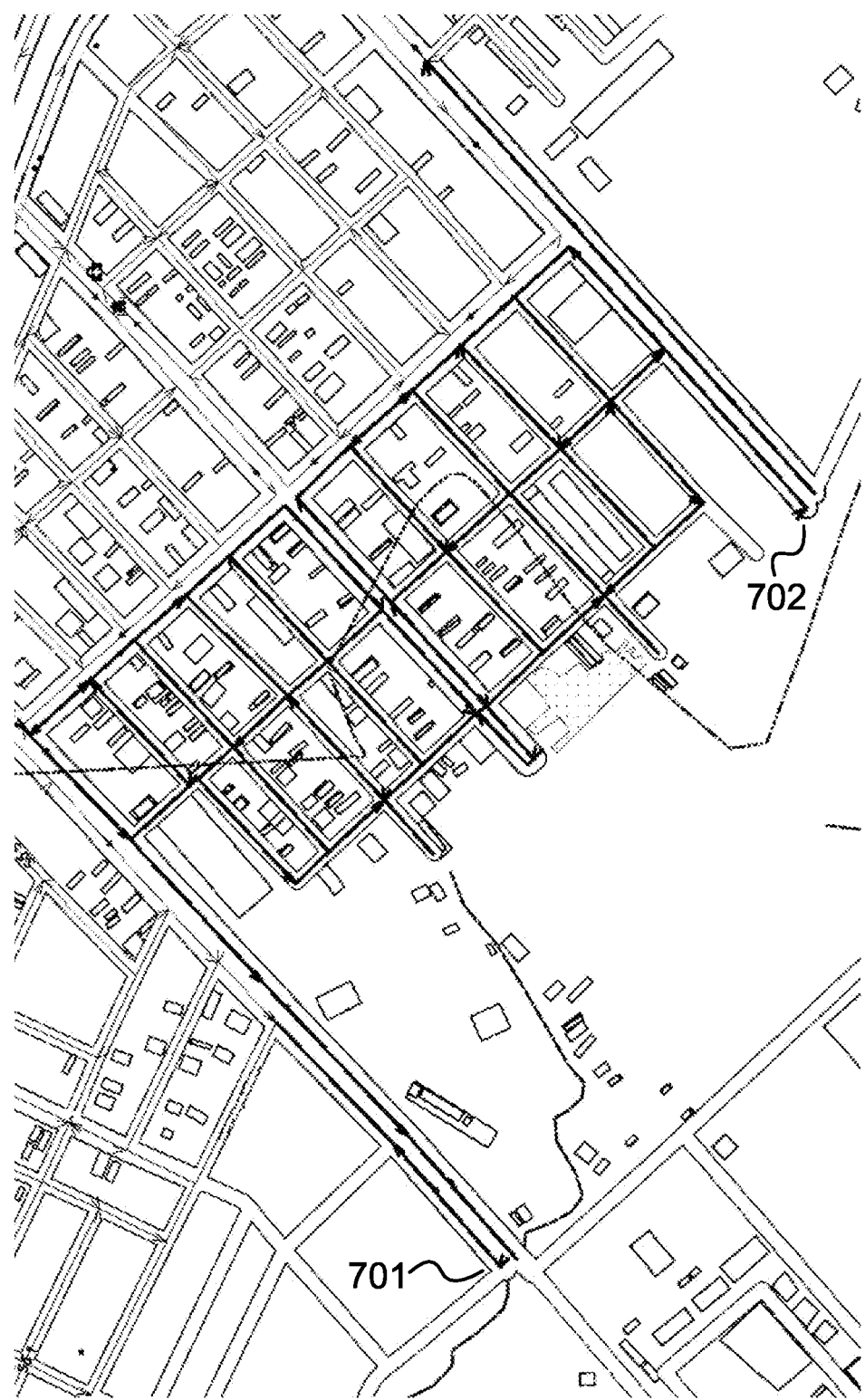
FIG. 7 shows an example wherein the map data misses a travel possibility between two lanes in two cases.

FIG. 7 shows an example wherein the map data misses a travel possibility between two lanes in two cases: the routing graph lacks a connection between the lane going to the lower left and the lane going to the upper right in the locations 701 and 702. From these two missing connections it can be deduced that the map data lacks, in each case, the travel possibility between the two lanes (e.g. a piece of road connecting the two lanes or the right to turn at the locations 701 and 702).

Figure 8:
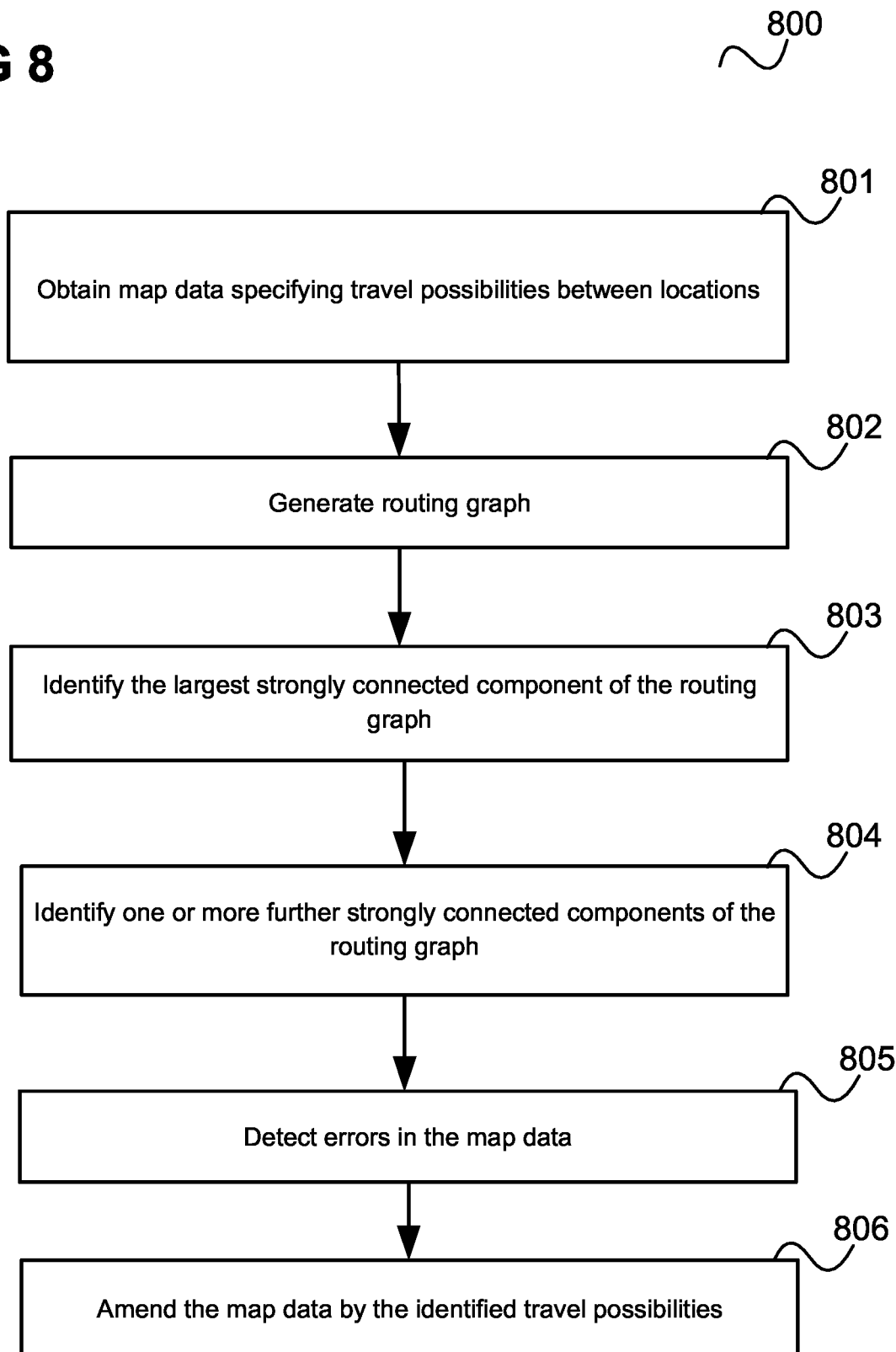
FIG. 8 shows a flow diagram illustrating a method for correcting errors in map data according to an embodiment.

In summary, according to various embodiments, a method is provided as illustrated in FIG. 8.

FIG. 8 shows a flow diagram 800 illustrating a method for correcting errors in map data.

In 801, map data specifying travel possibilities between locations is obtained.

In 802, a routing graph is generated from the map data by assigning a vertex to each location and an edge from one vertex to another vertex if the map data specifies that it is possible to travel from the location to which the first vertex is assigned to the location to which the second vertex is assigned.

In 803, the largest strongly connected component of the routing graph is identified.

In 804, one or more further strongly connected components of the routing graph are identified.

In 805, errors in the map data are detected by identifying travel possibilities that are not in the map data which lead to missing connections between the one or more further strongly connected components of the routing graph and the largest strongly connected component of the routing graph.

In 806, the map data is amended by the identified travel possibilities.

According to various embodiments, in other words, errors in a (geographic) map are determined using the strongly connected components of the corresponding routing graph as a basis. This can be seen to be based on the observation that even though routing failures occur from time to time, most places (locations) are usually routable from other places. That means that these places form an SCC. By identifying this SCC and placing it on the map it can be seen why the remaining parts of the map (i.e. locations) are not part of the SCC.

According to various embodiments, missing connections between SCCs are investigated, in particular between the further SCCs and the largest SCC, to find errors (i.e. lack of travel possibilities) in the map data. In other words, the lack of connectivity between the SCCs and the largest SCC is investigated to find errors in the map data.

The method of FIG. 8 may be part of a method for controlling a vehicle (or controlling the navigation of a vehicle) wherein the amended map data is provided to a vehicle and the vehicle (or its navigation) is controlled using the amended map data.

Figure 9:
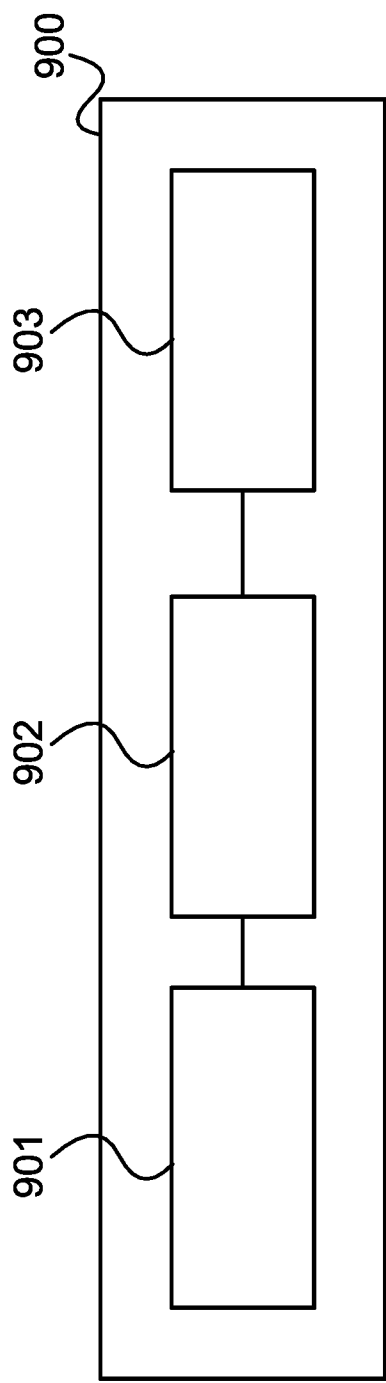
FIG. 9 shows a server computer according to an embodiment.

The method of FIG. 8 is for example carried out by a server computer as illustrated in FIG. 9.

FIG. 9 shows a server computer 900 according to an embodiment.

The server computer 900 includes a communication interface 901 (e.g. configured to receive map data to be processed (i.e. amended or enhanced) and/or to provide processed map data to another server (e.g. a navigation server) or a navigation device in a vehicle). The server computer 900 further includes a processing unit 902 and a memory 903. The memory 903 may be used by the processing unit 902 to store, for example, map data to be processed. The server computer is configured to perform the method of FIG. 8.

The methods described herein may be performed and the various processing or computation units and devices described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor. A "circuit" may also be software being implemented or executed by a processor, e.g. any kind of computer program, e.g. a computer program using a virtual machine code. Any other kind of implementation of the respective functions which are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for operating a server to correct errors in map data, comprising:
 downloading, to the server, map data specifying travel possibilities between locations;
 generating a routing graph from the map data by assigning a vertex to each location and an edge from one vertex to another vertex if the map data specifies that it is possible to travel from the location to which the first vertex is assigned to the location to which the second vertex is assigned;
 identifying the largest strongly connected component of the routing graph by identifying the largest component of the routing graph in which there is a path between all pairs of vertices of the component, and wherein the component is a subgraph of the routing graph;
 identifying one or more additional strongly connected components of the routing graph;
 detecting errors in the map data by identifying missing travel possibilities that are not in the map data which lead to missing connections between the one or more additional strongly connected components of the routing graph and the largest strongly connected component of the routing graph;
 amending the map data by adding the identified missing travel possibilities;
 transmitting the amended map data to a vehicle to control the navigation of the vehicle;
 determining a quality indicator of the routing graph, the quality indicator based at least in part on the ratio of strongly connected components to the number of vertices in the routing graph;
 storing the quality indicator as time series data associated with the map data;
 monitoring the quality of the map data by tracking the quality indicator over time; and
 generating an alarm signal when the quality indicator falls below a predetermined threshold.

2. The method of claim 1, wherein the missing travel possibilities are directed missing travel possibilities, and the routing graph is a directed routing graph.

3. The method of claim 1, wherein the missing travel possibilities comprise roads associated with an allowed travel direction.

4. The method of claim 1, further comprising associating each additional strongly connected component of the routing graph with a connectivity class of a plurality of connectivity classes, wherein the connectivity classes comprise one or more of a class of strongly connected components each being isolated from the largest strongly connected component and comprising multiple vertices, a class of strongly connected components each having a single vertex isolated from the other strongly connected components, a class of strongly connected components each having a single vertex which can only be reached from a vertex of one or more other strongly connected components, and a class of strongly connected components each having a single vertex which cannot be reached from any other strongly connected component but from which strongly connected component can be reached, wherein the method further comprises detecting errors in the map data using the connectivity classes associated with the additional strongly connected components of the routing graph.

5. The method of claim 1, further comprising associating groups of two or more strongly connected components of the routing graph with a connectivity relation of a plurality of connectivity relationships, wherein the connectivity relationships comprise one or more of a connectivity relationship indicating that there are edges between the strongly connected components of the group, a connectivity relationship indicating that the group of strongly connected components forms a maximum path of single vertices and a connectivity relationship indicating that historic driving data of a geographical region represented by the map data indicates that a driver has travelled between vertices of the strongly connected components which are not connected in the routing graph, wherein the method further comprises detecting errors in the map data using the connectivity relationships associated with the groups of strongly connected components of the routing graph.

6. The method of claim 1, further comprising acquiring historic driving data of a geographical region represented by the map data, determining whether there exists a pair of vertices comprising a first vertex and a second vertex in the routing graph wherein the map data does not specify a travel possibility from the first vertex to the second vertex but the historic driving data indicates that a driver has travelled from the location to which the first vertex is assigned to the location to which the second vertex is assigned and determining that the map data lacks a travel possibility from the location to which the first vertex is assigned to the location to which the second vertex is assigned if such a pair of vertices exists.

7. The method of claim 1, further comprising iteratively amending the map data by iteratively repeating the generating of a routing graph, identifying the largest strongly connected component of the routing graph, identifying one or more additional strongly connected components of the routing graph, detecting errors and amending the map data, wherein the map data amended in a previous iteration is used as map data for a current iteration.

8. The method of claim 1, further comprising exporting a specification of the identified strongly connected components of the routing graph to a visualization tool.

9. The method of claim 1 further comprising visualizing the identified strongly connected components of the routing graph.

10. The method of claim 9, wherein the visualizing further comprises visualizing connectivity classes of strongly connected components or connectivity relationships of groups of two or more strongly connected components or both.

11. The method of claim 9, wherein the visualizing further comprises overlaying the strongly connected components with a geographic map given by the map data.

12. The method of claim 1, further comprising navigating one or more vehicles by the amended map data.

13. A server computer for correcting errors in map data, comprising:
a communications interface; a memory interface; and a processing unit configured to:
obtain the map data specifying travel possibilities between locations;
generate a routing graph from the map data by assigning a vertex to each location and an edge from one vertex to another vertex if the map data specifies that it is possible to travel from the location to which the first vertex is assigned to the location to which the second vertex is assigned;
identify the largest strongly connected component of the routing graph by identifying the largest component of the routing graph in which there is a path between all pairs of vertices of the component, and wherein the component is a subgraph of the routing graph;
identify one or more additional strongly connected components of the routing graph;
detect errors in the map data by identifying missing travel possibilities that are not in the map data which lead to missing connections between the one or more additional strongly connected components of the routing graph and the largest strongly connected component of the routing graph;
amend the map data by the identified missing travel possibilities;
transmit the amended map data to a vehicle to control the navigation of the vehicle;
determine a quality indicator of the routing graph, the quality indicator based at least in part on the ratio of strongly connected components to the number of vertices in the routing graph; and
store the quality indicator as time series data associated with the map data;
wherein the processing unit is further configured to: monitor the quality of the map data by tracking the quality indicator over time; and generate an alarm signal when the quality indicator falls below a predetermined threshold.

14. A computer-readable medium comprising program instructions, which, when executed by one or more processors, cause the one or more processors to perform a method for correcting errors in map data, the method comprising:
downloading, to a server, map data specifying travel possibilities between locations;
generating a routing graph from the map data by assigning a vertex to each location and an edge from one vertex to another vertex if the map data specifies that it is possible to travel from the location to which the first vertex is assigned to the location to which the second vertex is assigned;
identifying the largest strongly connected component of the routing graph by identifying the largest component of the routing graph in which there is a path between all pairs of vertices of the component, and wherein the component is a subgraph of the routing graph;
identifying one or more additional strongly connected components of the routing graph;
detecting errors in the map data by identifying missing travel possibilities that are not in the map data which lead to missing connections between the one or more further additional strongly connected components of the routing graph and the largest strongly connected component of the routing graph;
amending the map data by the identified missing travel possibilities;
transmitting the amended map data to a vehicle to control the navigation of the vehicle;
determining a quality indicator of the routing graph, the quality indicator based at least in part on the ratio of strongly connected components to the number of vertices in the routing graph;
storing the quality indicator as time series data associated with the map data;
monitoring the quality of the map data by tracking the quality indicator over time; and generating an alarm signal when the quality indicator falls below a predetermined threshold.

* * * * *